No. 721,537. PATENTED FEB. 24, 1903.
W. M. BRISTOL & G. F. EBERHARD.
ANIMAL TRAP.
APPLICATION FILED OCT. 13, 1902.
NO MODEL.
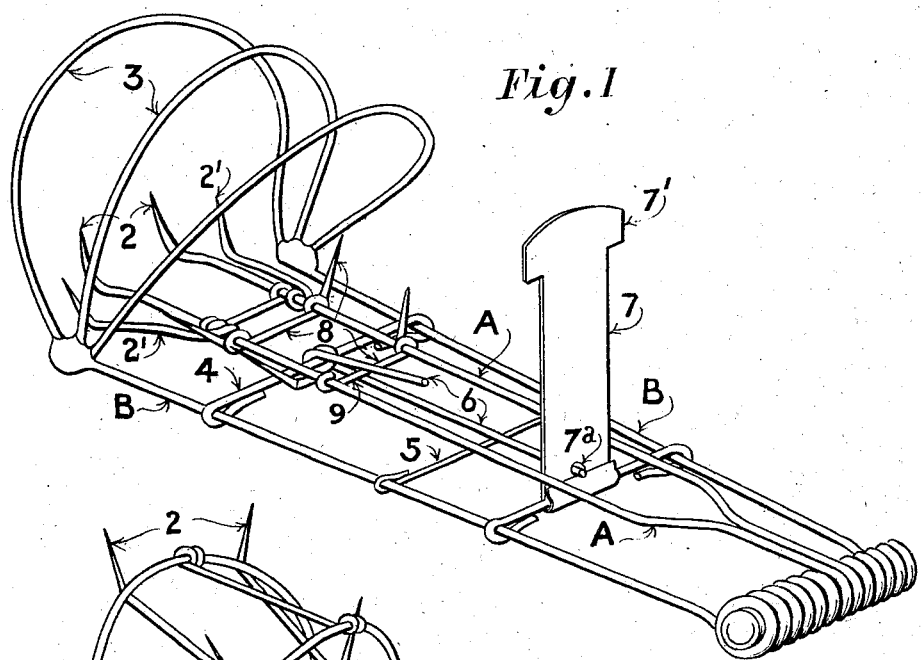
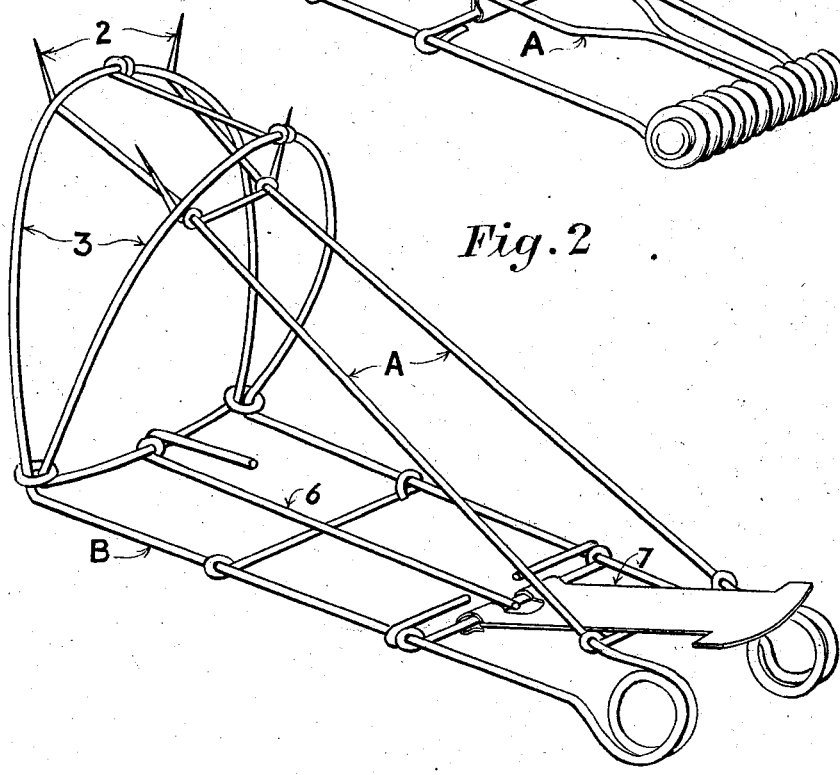
Witnesses,
J. H. Towne
F. F. S. Kelsey
Inventors
William M. Bristol
George F. Eberhard
By Dewey Strong & Co.
Attys

UNITED STATES PATENT OFFICE.

WILLIAM M. BRISTOL, OF EAST HIGHLANDS, AND GEORGE F. EBERHARD, OF SAN FRANCISCO, CALIFORNIA, ASSIGNORS TO THE GEO. F. EBERHARD COMPANY, OF SAN FRANCISCO, CALIFORNIA, A CORPORATION.

ANIMAL-TRAP.

SPECIFICATION forming part of Letters Patent No. 721,537, dated February 24, 1903.

Application filed October 13, 1902. Serial No. 127,011. (No model.)

*To all whom it may concern:*

Be it known that we, WILLIAM M. BRISTOL, residing at East Highlands, county of San Bernardino, and GEORGE F. EBERHARD, residing in the city and county of San Francisco, State of California, citizens of the United States, have invented an Improvement in Animal-Traps; and we hereby declare the following to be a full, clear, and exact description of the same.

Our invention relates to improvements in animal-traps, such as are used for gophers, squirrels, and the like.

The object of our invention has been to provide a trap which will be most certain of impaling and holding gophers of all sizes.

Frequently large gophers spring a trap by pushing a column of dirt ahead of them and escape unhurt, and the smaller gophers often escape from between the impaling members of a trap after the latter has been sprung.

Our invention consists of a plurality of loops or rings forming an extended passage through which the gopher enters, a spring-arm provided with impaling-teeth movable through the space inclosed by said rings, a trigger pivoted behind the base of the rings, and a tripper-plate pivoted rearward of the center of the trap, whereby the entrance of the gopher within the rings is assured before the trap is sprung.

It comprises details which will be more fully set forth hereinafter, having reference to the accompanying drawings, in which—

Figure 1 is a general view of a three-loop trap. Fig. 2 is a general view of a two-loop trap.

Having reference to the accompanying drawings, our trap is made in most part from a single piece of wire having a spring arm or jaw portion A, the end of which arm terminates in the upwardly-projecting prongs 2, the other portion of said trap forming a base B, upon the end of which are secured the looped or arch frames 3. The members of the base are connected at points back of the connection of the arches or rings 3 with the base by cross rods or wires 4 and 5, one above and one below the members. The first of these wires, which is disposed about an inch from the end of the trap, carries the trigger 6, and the second, 5, offers a stop to the downward swing of said trigger. The inverted position of these wires permits a greater depression of the jaw and trigger. A tripping-plate, as 7, is pivoted upon the base, preferably rearward of the center of the trap, and is provided with a suitable opening 7ª for the engagement of the longer arm of the trigger. This tripping-plate extends upward between the members of the spring-arm A and terminates in a cross-head portion 7', by which it is prevented from dropping down through the opening between said members to cause annoyance and delay in setting or occasion other inconvenience in the handling of the trap.

On the spring-arm A we provide the supplemental teeth or prongs 2', which are suitably secured to said arm and offer, in conjunction with the teeth 2, an extended line of impaling-points. Rearward of these may be provided one or more rows of divergent teeth, as 8. The short arm of the trigger 6 is caught over one of the cross-wires 9 on the jaw A when the latter is depressed to set the trap, as in Fig. 1.

In the position and construction of the loops 3 the following points are to be noted: The ends of the loops are brought near together and fixed rigidly to the base B. The loops extend upwardly and rearwardly in radial form, so that the tops thereof are considerably separated. The top of the rearmost loop is approximately midway between the front loop and the tripping-plate. Experience has shown that with this construction even the smallest gophers are sure to be caught.

By placing the tripping-plate well toward the rear end of the trap and bringing the trigger correspondingly within the outer end of the trap the larger gophers are unfailingly brought within range before the trap can be sprung.

By the arrangement of the prongs 8 and by having them incline outward instead of standing vertical they may be entirely hidden in the loose dirt.

With a trap of this character the gopher is generally clamped the entire length of his body, and escape is practically impossible.

If desired, a form of trap may be provided, as in Fig. 2, which has but two rings, and in which, as before, the base and jaw are formed of a single piece of spring-wire bent centrally upon itself, said bent portion serving as the first loop or ring. The second ring in this case attaches to the base at a point some distance back from and is disposed at an angle in relation to the first ring.

The action and qualifications of the impaling-teeth 2 and 2' would be the same if a trap with only one loop were employed.

Having thus described our invention, what we claim, and desire to secure by Letters Patent, is—

1. An animal-trap consisting in combination, of a base portion, a plurality of looped frames, a spring-arm portion connected to said base, and provided a plurality of impaling-points, means by which said arms may be set, and said impaling-points adapted to engage the spaces on either side of said loops when the arm is released.

2. The combination in an animal-trap, of a two-membered base portion, having a terminal loop portion approximately at right angles thereto, a spring-pivoted two-membered arm portion having its end extending through said loop, and terminating in impaling-teeth, a cross-bar connecting the members of the base portion near its forward end, a trigger having a short arm and a long arm pivoted thereon, a second bar connecting these members and which offers a stop to the downward movement of the trigger, a tripping-plate pivoted upon the base with which the longer arm of the trigger engages, said tripping-plate adapted to extend upwardly between the members of the spring-arm and provided with a cross-head portion whereby the trigger is prevented from dropping down below said members.

3. The combination in an animal-trap of a base portion, a plurality of loops upon said base, said loops extending in divergent planes from said base, a spring-arm portion secured to said base, and terminating in impaling-points, lateral extensions on said arm, said extensions terminating in impaling-teeth in line with the first-named teeth, said line of teeth adapted to engage the spaces on either side of the loops, and a trigger mechanism secured upon the base and adapted to engage with said spring-arm.

4. An animal-trap consisting in combination of a base, a plurality of radially-disposed loops secured thereto, and a spring-actuated jaw movable in the space inclosed by said loops.

5. An animal-trap consisting in combination of a base, a plurality of loops secured thereto, said loops having their tops widely separated, a spring-actuated jaw movable in the space inclosed by said loops, a trigger pivoted to the base at a point within the loops and a tripping-plate pivoted to the base, adjacent to the rearmost loop.

In witness whereof we have hereunto set our hands.

WILLIAM M. BRISTOL.
GEORGE F. EBERHARD.

Witnesses for William M. Bristol:
L. A. DESMOND,
J. H. POAGE.

Witnesses for George F. Eberhard:
D. B. RICHARDS,
S. D. STRITE.